United States Patent [11] 3,602,707

[72] Inventor Howard E. Jones
677-17th Ave. N.W., New Brighton, Minn. 55112

[21] Appl. No. 827,218
[22] Filed May 23, 1969
[45] Patented Aug. 31, 1971

[54] ANALOGUE MULTIPLIER-DIVIDER CIRCUIT INCLUDING A PAIR OF CROSS-COUPLED TRANSISTOR CIRCUITS

5 Claims, 2 Drawing Figs.

[52] U.S. Cl. .......... 235/195, 235/194, 235/196, 307/229, 328/161
[51] Int. Cl. .......... G06g 7/16
[50] Field of Search .......... 235/194, 195, 196; 307/229, 230; 328/160, 161

[56] References Cited

UNITED STATES PATENTS

| | | | |
|---|---|---|---|
| 3,304,419 | 2/1967 | Huntley, Jr. et al. .......... | 235/194 |
| 3,309,538 | 3/1967 | Ashley et al. .......... | 307/229 X |
| 3,432,650 | 3/1969 | Thompson .......... | 235/194 X |
| 3,437,836 | 4/1969 | Hull .......... | 307/229 X |
| 3,440,441 | 4/1969 | Ley .......... | 235/194 X |
| 3,454,786 | 7/1969 | Cannon, Jr. et al. .......... | 307/229 |

*Primary Examiner*—Malcolm A. Morrison
*Assistant Examiner*—Joseph F. Ruggiero
*Attorney*—Orrin M. Haugen

ABSTRACT: A circuit capable of performing analogue multiplication or division is shown. The analogue multiplier/divider circuit has balancing amplifiers respectively connected with transistor circuits, where the transistor circuits provide the nonlinear function necessary for analogue multiplier or divider functions.

INVENTOR
HOWARD E. JONES
BY Orrin M. Haugen
ATTORNEY

ANALOGUE MULTIPLIER-DIVIDER CIRCUIT INCLUDING A PAIR OF CROSS-COUPLED TRANSISTOR CIRCUITS

BACKGROUND OF THE INVENTION

1. Field of the Invention

This invention relates to the field of analogue circuits for multiplying and dividing analogue signals. More specifically, it relates to a single circuit for performing analogue multiplication and division depending upon the selection of input signals. Still more specifically, this invention relates to the field of analogue multiplier/divider circuits that utilize balanced amplifiers and transistors for accomplishing the multiplication and division functions.

2. Description of the Prior Art

Analogue multipliers, such as have been employed in analogue computers, have in the past utilized elaborate circuitry, for example, servomechanisms, function generators, phase modulators, and the like. Additionally, many of the prior art analogue computers have had serious limitations in that the applied signals to be multiplied could be only DC or slowly varying AC signals, and the bandwidth was generally restrictive. Due to the elaborate circuitry required, it was a common problem in the prior art that separate circuits were required for performing the analogue multiplication and division functions.

Various circuits have been proposed to overcome some of these disadvantages in deriving the ratio of two electrically represented magnitudes. One of these circuits utilizes the logarithmic characteristic of diodes. This arrangement, however, requires very finely balanced circuits, with the circuit operation extending over only a very restricted range of ratios as well as being very temperature sensitive. Another method of achieving the function relies on the fact that the time to discharge a capacitor is proportional to the ratio of the charge on the capacitor and the magnitude of the discharge current. Circuits utilizing this technique, of course, produce the solution only after a variable delay, and requires elaborate circuitry. Yet another type of circuit for manipulating signals representing quantities, relies on the reciprocal relationship between the impedance of a forward-biased diode and the current flow therethrough, this technique has the disadvantage of being useful for only very small ranges of signal values; and, moreover, requires very elaborate circuitry for its implementation.

SUMMARY

In summary, then, this invention includes a pair of cross-coupled transistor circuits, wherein each transistor circuit includes a pair of transistors, with each transistor having associated therewith a balancing amplifier for responding to applied input signals for controlling the ratio of current flow through the respective transistors, for providing a voltage output from one of the balanced amplifiers that represents the product of two applied input signals or the dividend of two applied input signals.

There is a need for a simple yet reliable analogue computer circuit for a variety of control applications and for analogue computer applications. Accordingly, it is a primary object of this invention to provide an analogue multiplier/divider circuit which is simple with respect both to components required and the operational requirements of the circuit. It is an additional object of this invention to provide a multiplier/divider circuit which utilizes matched transistors for minimizing variations due to temperature changes. It is yet an additional object of this invention to provide an analogue multiplier circuit which is capable of four quadrant operation, that is, having an output of the proper polarity for the particular polarity of the input signals. Still a further object of this invention is to provide an improved unbiased divider circuit. Yet another object of this invention is to provide an analogue multiplier circuit which is readily converted into an analogue divider circuit by the simple expedient of controlling the application of the input signals. The foregoing and other more detailed objectives will become apparent in the consideration of the following detailed description of the preferred embodiment when viewed in light of the drawings.

DESCRIPTION OF THE PREFERRED EMBODIMENT

Figures 1, 2:
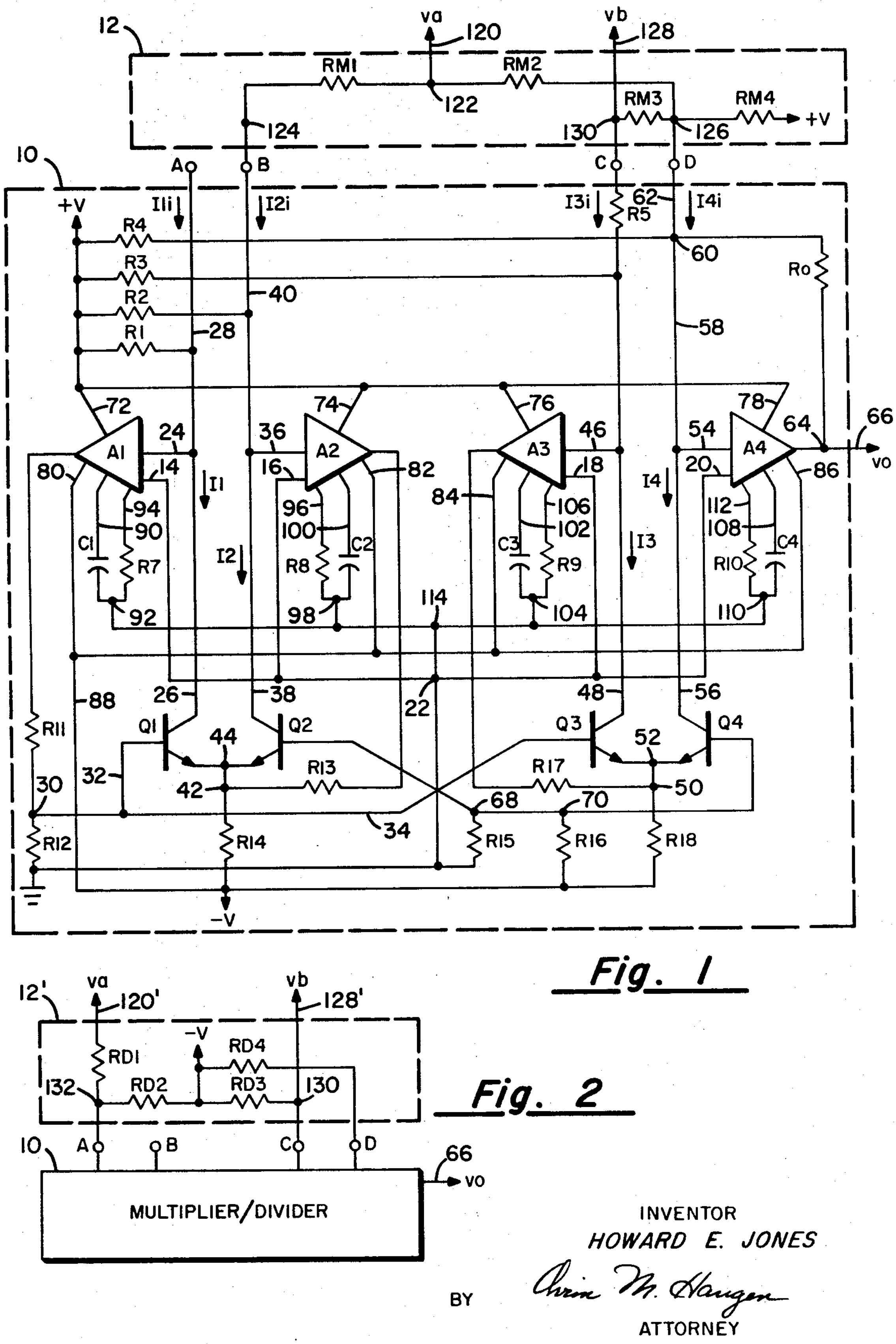
FIG. 1 is a schematic circuit diagram of the multiplier/divider circuit of this invention, with input signals coupled for operating the circuit as a four quadrant multiplier.
FIG. 2 is a partially schematic diagram illustrating the changes in the input portion for converting the circuit of FIG. 1 to a divider circuit.

This invention is concerned with analogue multipliers and dividers in general, and with analogue multipliers and dividers employing three-terminal devices such as bipolar or field-effect transistors, as the nonlinear elements in particular. The embodiment illustrated in FIG. 1, as explained in detail below, utilizes bipolar transistors Q1, Q2, Q3, and Q4 as the multiplier/divider element, but any other circuit element exhibiting a similar behavior can be used. In this embodiment, transistors Q1 and Q3 are matched halves of a commercially available transistor package, and transistors Q2 and Q4 are similarly matched transistors; and, accordingly, will tend to respond to temperature variations in a similar manner thereby rendering the circuit relatively insensitive to temperature changes.

It is well known that the collector current of a transistor is closely defined as a function of the exponential of the base-to-emitter voltage. This invention utilizes this nonlinear effect in a novel manner to obtain a multiplier/divider circuit having significant advantages over analogue multipliers or dividers available in the prior art.

Turning now to a detailed consideration of the circuit arrangement in the drawings, there is shown in FIG. 1 the multiplier/divider circuit enclosed within dashed block 10 and the multiplier input circuit shown within dashed block 12. The multiplier/divider circuit 10 has input terminals A, B, C, and D. Amplifiers A1, A2, A3, and A4 for instance available commercially as the AMELCO 809 amplifiers, have leads 14, 16, 18, and 20, respectively, coupled to node 22 which in turn is coupled to ground potential. Amplifier A1 has an input terminal 24 coupled to the collector electrode of transistor Q1 by way of wire 26 and to the A input terminal through wire 28, and to +V through resistor R1. The output terminal of amplifier A1 is coupled through resistor R11 to node 30. Node 30 is coupled through resistor R12 to ground, to the base of transistor Q1 through wire 32, and to the base of transistor Q3 through wire 34. Amplifier A2 has an input terminal 36 coupled through wire 38 to the collector of transistor Q2, through wire 40 to the B input terminal, and through resistor R2 to +V. The output terminal of amplifier A2 is coupled through resistor R13 to node 42. Node 42 is coupled to the junction 44 of the emitters of transistors Q1 and Q2, and is coupled through resistor R14 to −V. Amplifier A3 has an input terminal 46 coupled through wire 48 to the collector of transistor Q3, through resistor R5 to the C input terminal, and through resistor R3 to +V. The outer terminal of amplifier A3 is coupled through resistor R17 to node 50. Node 50 is coupled to the junction 52 of the emitters of transistors Q3 and Q4, and through resistor R18 to −V. Amplifier A4 has an input terminal 54 coupled through wire 56 to the collector of transistor Q4, through wire 58 to node 60, and through resistor R4 to +V. Input terminal D is coupled through wire 62 to node 60. The output terminal of amplifier A4 is coupled to node 64. Node 64 provides the output $v_o$ at output terminal 66, and is coupled through resistor $R_o$ to node 60. The bases of transistors Q2 and Q4 are coupled to node 68 and node 70. Node 68 is coupled through resistor R15 to ground and node 70 is coupled through resistor R16 to −V. Amplifiers A1 through A4 have terminals 72, 74, 76, and 78 respectively coupled to +V. The amplifiers also have terminals 80, 82, 84, and 86 coupled through wire 88 to −V. Amplifier A1 has terminal 90 coupled through capacitor C1 to node 92 and terminal 94 coupled through resistor R7 to node 92. Amplifier A2 has terminal 96 coupled through capacitor C2 to node 98 and terminal 100 coupled through resistor R8 to node 98. Amplifier A3 has terminal 102 coupled through capacitor C3 to node 104 and terminal 106 coupled through resistor R9 to node 104. Finally, amplifier A4 has terminal 108 coupled through capacitor C4 to node 110 and has terminal 112 coupled through resistor R10 to node 110. Nodes 92, 98, 104, and 110 are coupled at node 114 to node 22 and thence to ground.

In the multiplier input portion 12, there is an input terminal 120 for receiving input signal *va* coupled to node 122, with node 122 being coupled through resistor RM1 to output terminal 124, which in turn is coupled to input terminal B; and through resistor RM2 to output terminal 126, which in turn is coupled to input terminal D. A second input terminal 128 is arranged for receiving the input signal *vb*, and is coupled to node 130. Node 130 is coupled to input terminal C and through resistor RM3 to node 126. Resistor RM4 is coupled between +V and node 126, with node 126 being coupled to input terminal D.

Directing attention briefly to FIG. 2, there is shown in block form the multiplier/divider 10 described above, in conjunction with the divider input shown within dashed block 12'. It can be seen to form the analog divider, that the input signal *va* is applied to input terminal 120', which in turn, is directed through resistor RD1 to output terminal 132. Output terminal 132 is coupled to the input terminal A of the multiplier/divider circuit 10. In this arrangement, the B input terminal is left disconnected. The input signal *vb* is coupled to input terminal 128, with input terminal 128 being coupled directly to output terminal 130, which in turn is coupled directly to input terminal C. A biasing network comprised of resistors RD2, RD3, and RD4 is coupled to −V, with RD2 and RD3 coupled in common to −V and to RD5. RD2 is coupled to terminal 132, RD3 is coupled to terminal 130, and RD4 is coupled to input terminal D. The component values for the elements described above, have been found to operate satisfactorily for values and component selections set forth in table I:

TABLE I

| | |
|---|---|
| A1–A4 | AMELCO 809 Amplifiers |
| C1 | 0.01 microfarad, Capacitor |
| C2–C3 | 200 picofarad, Capacitor |
| C4 | 500 picofarad, Capacitor |
| R1–R4, R7 | 22K ohms, Resistor |
| R5, R16, Ro | 10K ohms, Resistor |
| R8, R9, R14, R18 | 6.8K ohms, Resistor |
| R10 | 3.3K ohms, Resistor |
| R11, R13, R17 | 4.7K ohms, Resistor |
| R12, R15 | 2.2K ohms, Resistor |
| RM1, RM2, RM3 | 10K ohms, Resistor |
| RM4 | Variable, Resistor |
| RD1 | 10K ohms, Resistor |
| RD2–RD4 | 22K ohms, Resistor |
| +V | + 12 Volts DC |
| −V | −12 Volts DC |
| Q1, Q3 | Fairchild SP986, Transistors |
| Q2, Q4 | Fairchild SP986, Transistors |

OPERATION

By connecting the circuit as illustrated in FIG. 1, the relationship of currents I1, I2, I3 and I4 flowing in the collector circuits of transistors Q1 through Q4 respectively, can be very closely given by the relationship of equation 1.

$$(I1/)I2)=k(I3/I4) \quad \text{(Equation 1)}$$

The balancing amplifiers A1 through A4 maintain essentially constant voltages at the collectors of the transistors by balancing the currents at their respectively associated collectors. The operation of these amplifiers results in the following approximations:

$$I1=I1i+(V/R1) \quad \text{(Equation 2)}$$

$$I2=I2i+(V/R2) \quad \text{(Equation 3)}$$

$$I3=I3i+(V/R3) \quad \text{(Equation 4)}$$

$$I4=I4i+(V/R4)+(vo/Ro) \quad \text{(Equation 5)}$$

By applying the foregoing relationships to the multiplier/divider circuit, the following relationship for *vo* is derived:

$$vo \cong Ro\left[\frac{\left(I2i+\frac{V}{R2}\right)\left(I3i+\frac{V}{R3}\right)}{\left(I1i+\frac{V}{R1}\right)}-I4i-\frac{V}{R4}\right] \quad \text{(Equation) 6}$$

It can be seen therefore, that various multiplying or dividing operations can be derived by the proper choice of I1*i*, I2*i*, I3*i*, and I4*i*, where *i* represents the input current designated. Examples of the multiplication and division will be discussed individually below. The only limitation on the selection of values for I1*i* through I4*i* is that for bipolar transistors, the collector currents I1 through I4 cannot change sign.

Taking the example of analogue multiplication first, the following relationships for *I1i* through 4*i* are derived, where $$RM1=Ra \quad \text{(Equation 7)}$$

$$R5=Rb \quad \text{(Equation 8)}$$

$$RM2=(RaR3)/R1 \quad \text{(Equation 9)}$$

$$RM3=(RbR2)/R1 \quad \text{(Equation 10)}$$

$$RM4=(R2R3R4)/(R1R4-R2R3) \quad \text{(Equation 11)}$$

then $$I1i=0 \quad \text{(Equation 12)}$$

$$I2i=va/Ra \quad \text{(Equation 13)}$$

$$I3i=vb/Rb \quad \text{(Equation 14)}$$

$$I4i=(R1/R3)(va/Ra)+(R1/R2)(vb/Rb)+(R1/R2)(V/R3)-(V/R4) \quad \text{(Equation 15)}$$

In these relationships, *Ra* and *Rb* represent the equivalent resistive values in the portion of input circuit 12 that are associated with input signals *va* and *vb*, respectively. With these relationships, the following expression for the output voltage *vo* is derived.

$$vo \cong [(RoR1/VRaRb)]\ va\ vb \quad \text{(Equation 16)}$$

Turning now to a consideration of the multiplier circuit, it will be noted that the circuit operates by maintaining the input voltages to amplifiers A1 through A4 at approximately ground potential; and, in this way, satisfies the relationships described earlier. In this regard, if *va* is increased, more current flows through resistor RM1 to input terminal 36 of amplifier A2. This increase in current must be offset by a corresponding increase in current flowing out through transistor Q2, thus the output of amplifier A2 tends to decrease slightly. Since there is no input to terminal A, amplifier A1 tends to maintain a constant current through transistor Q1 so the net effect is a new ratio of the collector currents of transistors Q1 and Q2. The currents in transistors Q3 and Q4 have almost the same relationship as do the currents in transistors Q1 and Q2 (see Equation 1) as was mentioned earlier in the description. The input signal *va* is also applied to terminal 54 of amplifier A4 through resistor RM2. If *vb* is assumed to be at ground potential ($vb=0$), then the increase in the current to the amplifier A4 from *va* produces an equal percentage increase in the current through transistor Q4 as occurred in the increase in current flow through transistor Q2 so that nothing else has to change to hold the balance. The result, then, is that the output signal *vo* remains unchanged at approximately the ground potential reflecting the correct multiplication. If, however, *vb* was not 0, then this fixed increase in current would represent a larger percentage increase for those cases where *vb* is less than 0, or a smaller percentage increase for *vb* larger than 0, and *vo* would change to maintain the balance, thereby indicating the multiplication.

Now with reference to FIG. 2, wherein the input signals are illustrated for the divider operation, the following relationships illustrate the definition of currents *I1i* through *Ii*, where $$RD1=Ra \quad \text{(Equation 17)}$$

$$R5=Rb \quad \text{(Equation 18)}$$

then $$I1i=(va/Ra)-(V/R1) \quad \text{(Equation 19)}$$

$$I2i=0 \quad \text{(Equation 20)}$$

$$I3i=(vb/Rb)-(V/R3) \quad \text{(Equation 21)}$$

$$I4i=(V/R4) \quad \text{(Equation 22)}$$

By solving the foregoing for the output voltage term *vo*, the following relationship can be derived.

$$vo \cong [(VRoRa)/(RbR2)]\ (vb/va) \qquad \text{(Equation 23)}$$

By following through the operation of the circuit, it can be seen that the output voltage *vo* will represent the division of input analog signals *vb* and *va*.

CONCLUSION

Having provided a detailed description of the preferred embodiment of a circuit that can be operated as either an analogue multiplier or analogue divider circuit, and having illustrated the necessary controls of the application of the input signals, it can be seen that the various stated purposes and objectives of the invention have been achieved. It is recognized that various uses of the invention will be recognized by those skilled in the art. It is further recognized that variations in circuit component values and arrangements will become apparent to those skilled in the art without departing from the spirit and scope of the invention. What is intended, therefore, to be protected by Letters Patent is set forth in the appended claims.

I claim:

1. Analog multiplier/divider circuitry for alternatively multiplying or dividing a pair of quantities represented by time-varying current input signals comprising: first, second, third and fourth transistors, each having base, emitter, and collector electrodes; first, second, third, and fourth balancing amplifier means, each having an output terminal and first and second control terminals; first, second, third, and fourth load means, each having first and second contacts, each of said first contacts coupled in common for coupling to a first source of potential; first, second, third, and fourth input terminals for receiving time-varying current input signals; first coupling means for coupling said first input terminal to said first control terminal of said first amplifier means and said collector electrode of said first transistor; second coupling means for coupling said second input terminal to said first control terminal of said second amplifier means and said collector electrode of said second transistor; third coupling means for coupling said third input terminal to said first control terminal of said third amplifier means and said collector electrode of said third transistor; fourth coupling means for coupling said fourth input terminal to said first control terminal of said fourth amplifier means and said collector electrode of said fourth transistor; fifth coupling means for coupling said emitter electrodes of said first and second transistors in common to said second balancing amplifier means output terminal, said fifth coupling means including means for coupling to a second source of potential; sixth coupling means for coupling said emitter electrodes of said third and fourth transistors in common to said third balancing amplifier means output terminal, said sixth coupling means including means for coupling to said second source of potential; seventh coupling means for coupling said first balancing amplifier output terminal in common to said base electrodes of said first and third transistors; first impedance means for coupling said seventh coupling means to a third source of potential; eighth coupling means for coupling said base electrodes of said second and fourth transistors in common to said third source of potential; second impedance means for coupling said eighth coupling means to said second source of potential; ninth coupling means for coupling said second control terminals of said first, second, third, and fourth balancing amplifier means in common for coupling to said third source of potential; output impedance means coupled intermediate said fourth input terminal and said fourth balancing amplifier means output terminal; and output terminal means coupled to said fourth balancing amplifier means output terminal for alternatively providing the result of analog multiplication or division.

2. Circuitry as in claim 1 wherein said first and third transistors and said second and fourth transistors are matched pairs for providing matched responses to temperature changes.

3. Circuitry as in claim 1 and further including multiplier input means coupled to predetermined ones of said input terminals for providing time-varying current signals thereto, said multiplier input means including first and second analog voltage input terminals for receiving first and second analog voltage signals, respectively, said first and second analog voltages to be multiplied, and means for converting analog voltage signals so received to time-varying current signals.

4. Circuitry as in claim 1 and further including four-quadrant analog multiplier input means having first and second analog voltage input terminals for receiving first and second analog voltage signals, respectively, first impedance coupling means for coupling said first analog voltage input terminal to said second and fourth input terminals for providing first time-varying current signals thereto; and second impedance coupling means for coupling said second analog voltage input terminal to said third and fourth input terminals for providing second time-varying current signals thereto.

5. Circuitry as in claim 1 and further including analog divider input means coupled to predetermined ones of said input terminals for providing time-varying current signals thereto, said analog divider input means including first and second analog voltage input terminals for receiving first and second analog voltage signals, respectively, said first and second analog voltage signals to be divided; and means for converting analog voltage signals so received to time-varying current signals.